(12) United States Patent
Natani et al.

(10) Patent No.: US 9,407,950 B2
(45) Date of Patent: Aug. 2, 2016

(54) CONTROLLING DEVICES IN ENTERTAINMENT ENVIRONMENT

(71) Applicant: MICROSOFT TECHNOLOGY LICENSING, LLC, Redmond, WA (US)

(72) Inventors: Ripin Natani, Bellevue, WA (US); Eliezer Payzer, Seattle, WA (US); Brian Joseph Ewanchuk, Redmond, WA (US); John Thomas Kimbell, Kirkland, WA (US); Brent Campbell, Bothell, WA (US); Paul Heidelman, Redmond, WA (US); Philip J. Nachreiner, Duvall, WA (US); Luis Delgado de Mendoza Garcia, Seattle, WA (US); Alexander Gurzhi, Cupertino, CA (US); Yuriy Tarasov, Santa Clara, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 97 days.

(21) Appl. No.: 13/949,077

(22) Filed: Jul. 23, 2013

(65) Prior Publication Data
US 2015/0033275 A1   Jan. 29, 2015

(51) Int. Cl.
*H04N 21/65* (2011.01)
*H04N 21/422* (2011.01)
(Continued)

(52) U.S. Cl.
CPC .......... *H04N 21/42225* (2013.01); *G08C 19/00* (2013.01); *H04N 21/4113* (2013.01); *H04N 21/4131* (2013.01); *H04N 21/42204* (2013.01); *H04N 21/42221* (2013.01); *H04N 21/43615* (2013.01); *H04N 21/43635* (2013.01); *H04N 21/43637* (2013.01); *H04N 21/65* (2013.01); *H04N 21/6543* (2013.01)

(58) Field of Classification Search
CPC combination set(s) only.
See application file for complete search history.

(56) References Cited

U.S. PATENT DOCUMENTS 8,260,975 B1   9/2012   Schanin et al.
8,294,821 B1   10/2012  Overby et al.
(Continued)

FOREIGN PATENT DOCUMENTS

GB         2460219 A      11/2009

OTHER PUBLICATIONS

Epelde, et al., "Universal Remote Console-based Next-generation Accessible Television", Retrieved at <<http://www.dfki.de/~rnessel/pdf/urc_television.pdf>>, In Proceeding of Universal Access in the Information Society, vol. 12, Issue 1, Mar. 2013, pp. 15.
(Continued)

*Primary Examiner* — Kieu Oanh T Bui
(74) *Attorney, Agent, or Firm* — Aaron Chatterjee; Judy Yee; Micky Minhas (57) ABSTRACT

Embodiments for controlling one or more external audio-visual devices are provided. In one example, a method comprises receiving a device command and determining an intent of the device command. The intent includes an action and an external device to perform the action. The method further comprises selecting a selected protocol for communicating the device command to the external device, where the selected protocol is selected from a plurality of supported protocols, and communicating the device command to the external device according to the selected protocol.

19 Claims, 5 Drawing Sheets

(51) Int. Cl.
*H04N 21/41* (2011.01)
*G08C 19/00* (2006.01)
*H04N 21/436* (2011.01)
*H04N 21/4363* (2011.01)
*H04N 21/6543* (2011.01)

(56) References Cited

U.S. PATENT DOCUMENTS

| | | | | |
|---|---|---|---|---|
| 8,730,297 | B2 * | 5/2014 | Fornell et al. | 348/14.12 |
| 8,797,377 | B2 * | 8/2014 | Mauchly et al. | 348/14.08 |
| 2006/0168103 | A1 * | 7/2006 | Motoyama | H04L 69/18 |
| | | | | 709/217 |
| 2008/0247544 | A1 | 10/2008 | Candelore et al. | |
| 2009/0089850 | A1 | 4/2009 | Nakajima et al. | |
| 2011/0242432 | A1 | 10/2011 | Suzuki et al. | |
| 2012/0249890 | A1 | 10/2012 | Chardon et al. | |
| 2012/0319942 | A1 | 12/2012 | Kim et al. | |
| 2014/0109144 | A1 * | 4/2014 | Asnis et al. | 725/48 |
| 2014/0118468 | A1 * | 5/2014 | Purdy et al. | 348/14.08 |

OTHER PUBLICATIONS

"What is a HDMI CEC Standard?", Retrieved at <<http://hdmicec.blogspot.in/>>, May 19, 2012, pp. 2.

Pan, et al., "GeeAir: A Universal Multimodal Remote Control Device for Home Appliances", Retrieved at <<http://www.cs.zju.edu.cn/~gpan/publication/2010-PUC-GeeAir.pdf>>, In Journal of Personal and Ubiquitous Computing, vol. 14, Issue 8, Dec. 2010, pp. 13.

ISA European Patent Office, International Search Report and Written Opinion Issued in Application No. PCT/US2014/047342, Oct. 2, 2014, WIPO, 11 Pages.

* cited by examiner

FIG. 5

CONTROLLING DEVICES IN ENTERTAINMENT ENVIRONMENT

BACKGROUND

Many home entertainment systems include multiple audio-visual devices, such as televisions, digital video recorders, stereo systems, and the like, that may be controlled via remote control devices. Additionally, other components present in the environment, such as lamps, thermostats, and fireplaces, may also be remotely controlled. Each device may be optimally controlled via one type of communication protocol, such as infrared signaling. However, different devices may be controlled by different communication protocols. Further, even in a given device, different actions may be controlled according to different protocols.

SUMMARY

Embodiments for controlling one or more external audio-visual devices are provided. In one example, a method comprises receiving a device command and determining an intent of the device command. The intent may include an action and an external device to perform the action. The method further comprises selecting a selected protocol for communicating the device command to the external device, where the selected protocol is selected from a plurality of supported protocols, and communicating the device command to the external device according to the selected protocol.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, a home entertainment system may include multiple audio-visual devices each with its own remote input device. In light of the potential difficulties a person may encounter tracking which remote control device goes to which device, and also with keeping track of the locations of all of the remote control devices, some users may choose to use a universal remote control device. A universal remote control device is configured to operate with multiple different devices, for example, by storing control codes used for the multiple different devices. However, universal remote controls may require time-consuming configuration by users to set up the remote before it can be used. Further, universal remote controls may utilize a single type of communication protocol, such as an infrared transmission protocol. As such, universal remote controls may not be suitable for use with devices that use other communications protocols. The term "protocol" as used herein may refer to physical communications technologies and/or logical and/or algorithmic constructs useable with the physical communications technologies to communicate data between a transmitting device and a receiving devices.

Additionally, in some instances, a home entertainment device may control other home entertainment devices, for example, via HDMI consumer electronics control (CEC) commands. As one non-limiting example, a digital video recorder (DVR) may communicate with a television to turn the television on and adjust a television volume when the DVR is powered up by a user. However, not all devices may support HDMI CEC commands. Further, some devices may support only a subset of CEC commands.

As such, various technologies may be used to translate between home entertainment device command protocols, and thus to increase a functionality of a HDMI CEC-enabled device. For example, infrared (IR) blasting is a technology that translates commands received via a non-IR protocol (e.g. via HDMI CEC) into infrared signals for transmission to devices to be controlled. However, the translations used by such devices are generally pre-set. Thus, such devices may not be dynamically adaptable to accommodate issues such as new devices and communication failures. Further, IR blasting and utilizes line-of-sight communications that can be disrupted where the line of sight between the remote control and controlled device is interrupted. Further, IR blasting is sent blindly, as it supports no ability to acknowledge or verify that a command was sent successfully.

Accordingly, embodiments are disclosed herein that relate to intelligently controlling home entertainment devices that may utilize multiple different communications protocols for receiving control inputs. Briefly, the disclosed embodiments may receive command inputs via various different input devices, for each command input determine an intended command (e.g. intended device and intended action), and select a protocol from among multiple supported protocols to use to communicate the intended action to the intended device. The command interpretation and the protocol selection may be performed by a single device in a home entertainment system, such as a set top box, video game console, home entertainment computer, digital video recorder, media player, and/or other devices, or may be distributed among plural devices.

Figure 1:
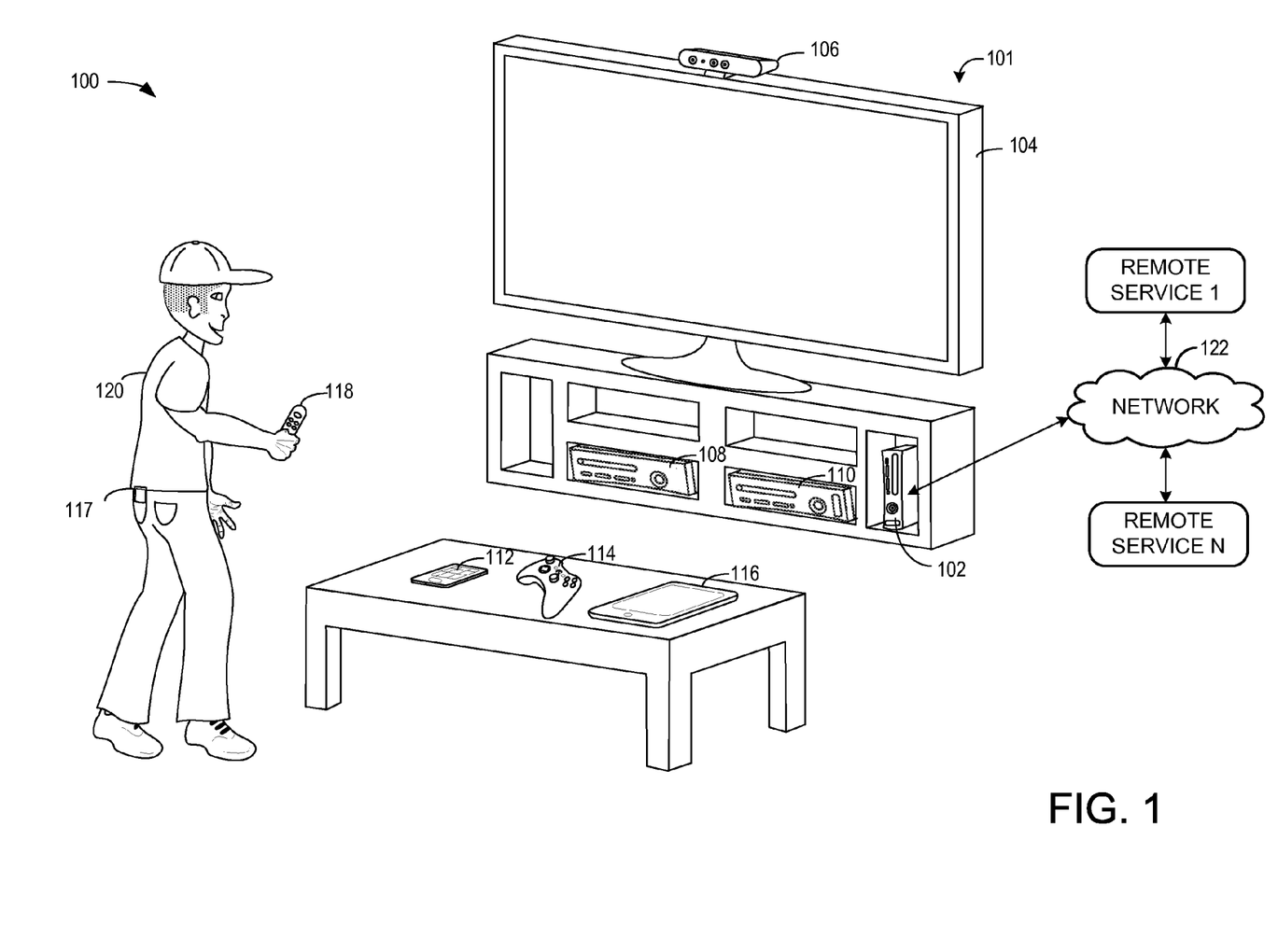
FIG. 1 shows an example home entertainment environment according to embodiment of the present disclosure.

FIG. 1 shows a non-limiting example of a home entertainment environment 100 that comprises an entertainment system 101 including a computing device 102 and display device 104. Entertainment system 101 also comprises a plurality of example external devices operatively connected to entertainment system 101, including set-top box 108 and receiver 110. Further, home entertainment environment 100 also includes a plurality of user input devices that may be used to control one or more of the external devices and/or entertainment system 101. Example input devices include but are not limited to sensor system 106, mobile device 112, game controller 114, external computing device 116 (e.g. a tablet computer), a mobile device 117, and remote control device 118. The sensor system 106 may include such components as one or more depth cameras (e.g. a time-of-flight and/or structured light depth camera), one or more visible light cameras (including but not limited to stereo camera arrangements), one or more microphones (e.g. a directional microphone array), and/or any other suitable sensor useable to monitor and/or tracks objects and users within the use environment.

Computing device 102 may be used to play a variety of different games, play one or more different media types, record one or more different media types (e.g. as a digital video recorder), and/or control or manipulate applications and/or operating systems. Display device 104, such as a television or a computer monitor, may be used to present media content, game visuals, etc., to users. As one example, display device 104 may be used to visually present media content received by computing device 102.

Display device 104 may be operatively connected to computing device 102 via a display output of the computing device. For example, computing device 102 may include an HDMI or other suitable wired or wireless display output. Display device 104 may receive video content from computing device 102, and/or may include a separate receiver configured to receive video content directly from a content provider. Further, one or more aspects of display device 104 may be controlled independently of computing device 102. As an example, the display device volume, power, selected channel, display configurations, etc., and/or any other suitable state settings may be controlled directly through display device 104, e.g., via an associated remote control device 118.

The sensor system 106 may be operatively connected to the computing device 102 via one or more interfaces. As a non-limiting example, the computing device 102 may include a universal serial bus (USB) via which the sensor system 106 may be connected to the computing device 102. The various sensors of sensor system 106 may be used to recognize, analyze, and/or track one or more human subjects and/or objects within a physical space. Sensor system 106 may include an infrared light to project infrared light onto the physical space and a depth camera configured to receive infrared light.

The one or more additional devices (such as set-top box 108 and receiver 110) may also be operatively coupled to computing device 102 via an HDMI or other wired or wireless connection (e.g. Ethernet, Bluetooth, WiFi, WiFi Direct, etc.). As such, computing device 102 may be configured to communicate with each external device present in home entertainment environment 100.

FIG. 1 also shows non-limiting examples of input devices that may be used to control one or more of the computing device 102, display device 104, sensor system 106, set-top box 108, and/or receiver 110. The input devices illustrated in FIG. 1 include a mobile device 112, game controller 114, external computing device 116, and remote control device 118, as well as the previously-mentioned sensor system 106. It will be understood that these input devices are described for the purpose of example, and are not intended to be limiting in any manner.

User input devices, such as those described above, may communicate with computing device 102 and/or additional devices in any suitable manner, including but not limited to wired and/or wireless configurations. Examples include, but are not limited to, direct radiofrequency (RF) communications channels, wireless network channels (e.g., Internet Protocol, Wi-Fi direct, or BLUETOOTH), wired communication channels (HDMI, USB, Ethernet, etc.), and infrared communications channels.

As a more specific example, mobile device 112 and external computing device 116 may be configured to wirelessly communicate with computing device 102 and/or additional external devices via a non-infrared communication channel (e.g., IEEE 802.15.x, IEEE 802.11.x, proprietary radio signal, etc.), game controller 114 may be configured to communicate with computing device 102 and/or additional external devices via a USB communication channel, and remote control device 118 may be configured to communicate with computing device 102 and/or additional external devices via an infrared communication channel in order to control one or more actions of computing device 102 and/or additional external devices.

Further, in some examples, gesture and/or voice input from user 120 may be used to control one or more aspects of home entertainment environment 100. For example, computing device 102 may receive image and/or audio information from sensor system 106 and identify in such image and/or audio information voice commands, body gestures, body postures, and/or other such data used to control computing device 102 and/or additional external devices.

Each external device may be configured to receive commands via a single communication protocol, or via multiple communication protocols. Additionally, as described above, computing device 102 may be configured to receive user input from a variety of input devices.

As such, computing device 102 may include stored instructions that are executable to intelligently choose a communication protocol to use when communicating a received command to an external device. As one example, computing device 102 may have the ability to communicate device commands to display device 104 via more than one communication protocol, such as by HDMI CEC communication protocol and by infrared communication protocol. Thus, if computing device 102 receives a device command from mobile device 112 requesting to change the volume of the display device 104, the computing device 102 may select a protocol from among the supported communication protocols and communicate the device command to the display device 104 using the selected protocol.

The computing device 102 may select a communication protocol for communicating a device command to a specific device based on any suitable factor or factors. For example, the computing device 102 may store device capabilities for each external device to allow selection of a communication protocol according to the device capabilities, as each external device may support communication via a subset of supported communication protocols.

In some instances some actions performed by an external device may be controlled via a single protocol, while other actions may be controlled via multiple protocols. Where a command may be performed via more than one protocol, the computing device 102 may select a communication protocol determined to be the most reliable for communicating that command. As a more specific example, if an external device allows a selected command to be performed by both HDMI CEC and IR protocols, then HDMI CEC may be selected based upon the ability to receive confirmation messages.

The device capabilities information may be stored on computing device 102, and/or on a remote computing device. To obtain the device capabilities information from a remote computing device, computing device 102 may communicate with one or more remote services, illustrated as remote services 1 and N, via a network 122. Upon installation of a new external device in a home entertainment system 101, the computing device 102 may obtain device capabilities information from a remote computing device for local storage.

Where a selected command may be made by two or more different protocols, the computing device 102 may be configured to select a second protocol to send the command in the event that the command is not successfully performed via the initially selected protocol. For example, when the primary protocol supports confirmation messages, if the confirmation message reports that the command was not successfully received, then a second protocol may be selected to send the command. As another example, the computing device 102 may monitor the state of each external device, and determine if a change of state occurs following communication of a device command. If a change of state occurs, computing device 102 may determine that the device command communication was successful. On the other hand, if a change of state does not occur, computing device 102 may determine that the device command communication was not successful, and communicate the device command according to a different supported protocol.

Figure 2:
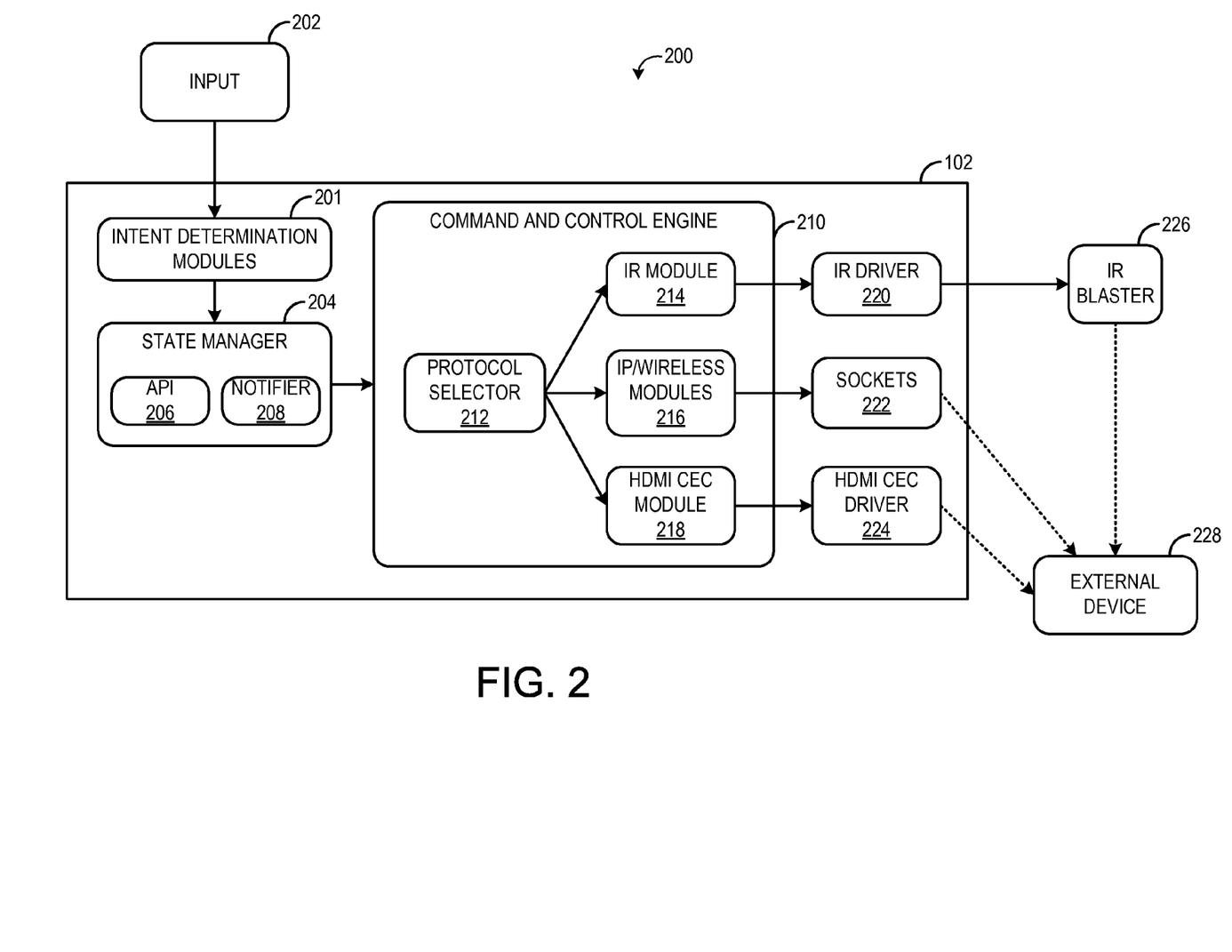
FIG. 2 shows a block diagram depicting an example embodiment of a device control management system according to an embodiment of the present disclosure.

FIG. 2 schematically shows an example embodiment of a device control management system 200 that may be implemented via computing device 102, and also illustrates a flow of communication through the device control management system 200. Device control management system 200 is depicted as including a state manager 204 and command and control engine 210. These components may be implemented on computing device 102 in any suitable combination of hardware, software, and firmware.

Upon receipt of an input of a device control command, the computing device first determines the intent of the device via one or more intent determining modules 201. The intent determining modules may be included as part of computing device 102, as illustrated, or may be separate from computing device 102 (e.g. incorporated into devices that receive the inputs). Inputs may be received from any suitable source, including but not limited to a remote control device, mobile phone, tablet computer, laptop computer, game control, sensor system (e.g. voice and/or gesture commands), and home entertainment devices (e.g. HDMI CEC commands). As such, each type of input may have an associated intent determining module to interpret the command.

Upon determining the intent of the command, the intent determination module that interpreted the command may communicate the intent to an API 206 (application programming interface) of the state manager 204. The state manager 204 then may provide the determined intent to the command and control engine 210, which may choose a communication protocol for communicating the device command to the external device 228. As mentioned above, the command and control engine may utilize any suitable logic to select a communications protocol for a received command.

Additionally, the state manager 204 may track the state of the external device 228 and other controllable devices in communication with the computing device 102 to detect changes of state of the external device 228 and other devices. For example, the state manager 204 may track whether each connected device is on or off, a current television channel the display device is displaying, a volume setting of each device, etc. The state manager further may include a notifier 208 configured to provide notifications to the command and control engine 210 and/or the connected external devices of the current state of each external device.

The command and control engine 210 includes a protocol selector 212 that applies suitable logic to select a communication protocol for communicating the device command to the external device 228. For example, the protocol selector 212 may access, for example, device capabilities information for the external device 228 to determine which communication protocols are supported by that device. Further, the device capabilities information also may specify device actions which may be performed by a selected protocol for a device, where more than one protocol is supported by the device. For example, the control of a power state of a display device 104 may be controllable by both IR and HDMI CEC communication protocols, while the volume may be controlled by IR alone.

To communicate with external devices, the command and control engine 210 includes a plurality of pluggable communication modules. Each module enables the use of a specific communication protocol for communicating device commands to an external device. Example communication modules include an infrared (IR) module 214, IP/wireless modules 216, and HDMI CEC module 218. The IP/wireless modules may include one or more of an Ethernet module, a Wi-Fi module, a Wi-Fi direct module, and a BLUETOOTH module. Any other suitable modules, such as a USB module, also may be used.

Upon selection of a communication protocol for an external device command, the corresponding communication module is called to communicate with the external device, e.g. via a suitable driver or socket. For example, the IR module 214 may instruct an IR driver 220 associated with an IR blaster 226, the IP/wireless modules may communicate via sockets 222, and the HDMI CEC module may instruct an HDMI CEC driver 224 to communicate the device command to the external device 228. The IR blaster 226 may be a suitable device that emits an IR signal, and may be integrated in computing device 102 or contained separately from computing device 102. In one non-limiting example, IR blaster 226 may comprise an IR light emitter of sensor system 106 (e.g. a structured light camera projector or time-of-flight camera light pulse source).

Figure 3:
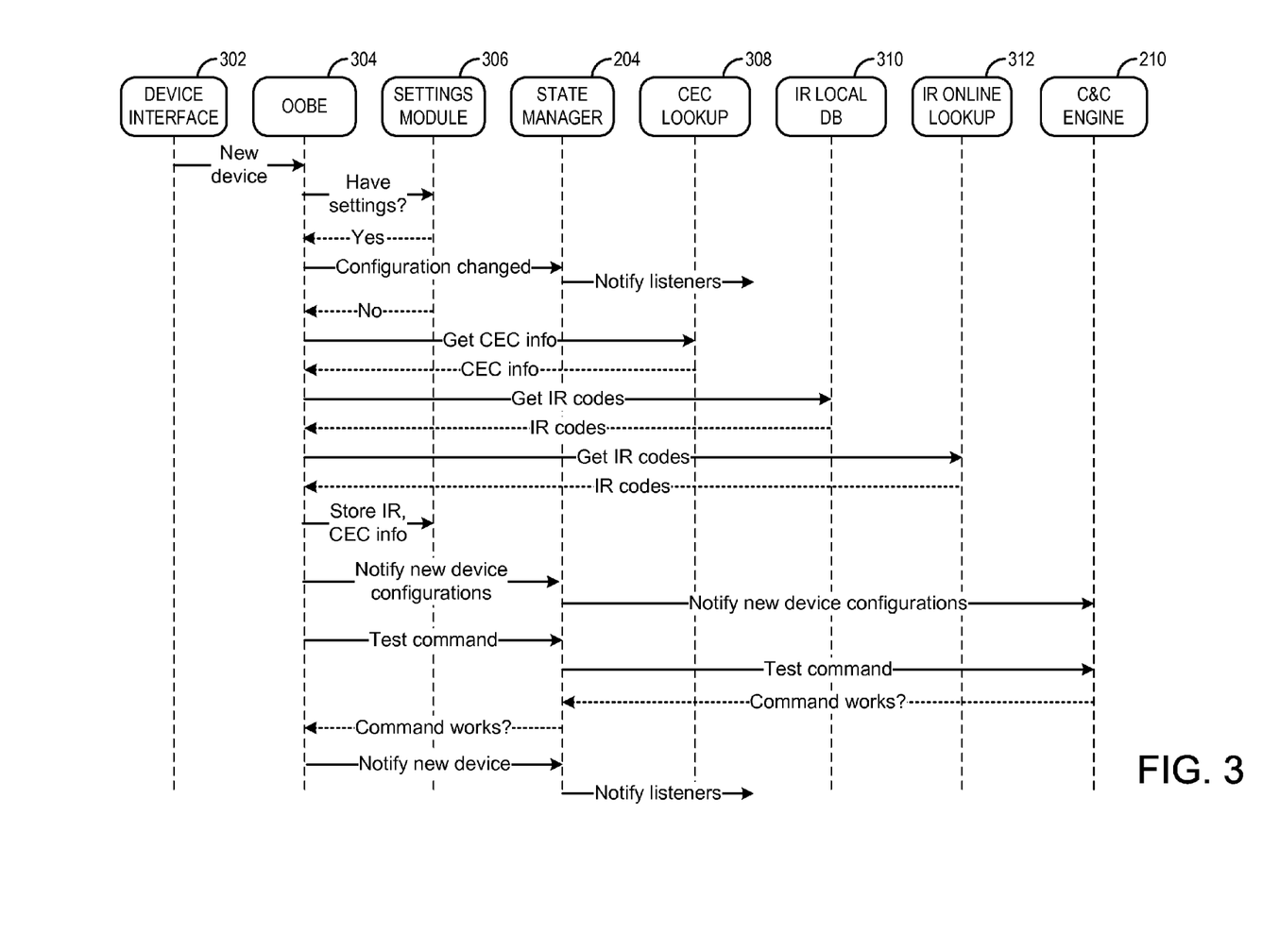
FIG. 3 illustrates an example embodiment of a method of installing a new external device for use with the system of FIG. 2.

The use of pluggable communication modules may help to provide an extensible platform for the efficient addition of new communications protocols as users acquire new home entertainment devices. FIG. 3 shows a diagram illustrating an embodiment of a method of adding a new home entertainment device to the device control management system of FIG. 2. When a new device is connected to the computing device 102, the computing device 102 may obtain device capabilities information for that device in order to determine which communication protocol to use to communicate device commands. The computing device 102 also may notify other devices that a new device is connected and issue a test command to determine if the chosen communication protocol successfully communicates the device command to the new device.

When a new device is connected to the computing device 102, a device interface 302 communicates that a new device is detected to an out of box experience module (OOBE) 304 of the computing device. The OOBE may control the process of installing and/or performing the initial connection of the new device to the computing device 102. When the OOBE module 304 receives indication that a new device is detected, the OOBE module queries a settings module 306 to determine if the computing device has the settings for the new device. The settings for the new device may include supported communication protocols, among other capabilities.

If the settings module already has the settings for the new device, it informs the OOBE module 304 that the settings are present, and the OOBE module 304 notifies the state manager 204 of a configuration change (e.g., that a new device is present). The state manager 204 notifies all listeners (such as other external devices) that a new device is present.

If the settings module does not already include the settings for the new device, it informs the OOBE module that the settings are not present. The OOBE module then sends a request for the device capabilities to one or more remote services. In the example illustrated in FIG. 3, the OOBE module requests HDMI CEC information from a CEC look up service 308. Further, the OOBE module requests IR code information from a local IR database 310. If the IR codes for the new device are not included in the local IR database, the OOBE module requests IR codes for the new device from an online IR code lookup 312. The CEC information and IR codes received by the OOBE are stored in the settings module 306.

After receiving the device capabilities, the OOBE notifies the state manager 204 that new device capabilities are present. The state manager 204 then notifies the command and control engine 210 of the new device capabilities. Further, the OOBE module may request that a test command be issued to confirm that the computing device is able to communicate with the new device using the protocol or protocols specified by the obtained capabilities. Thus, a test command request is issued by the OOBE module to the state manager 204, which then relays the test command to the command and control engine 210. The test command may direct the new device to perform an action detectable by the state manager, and may be communicated according to a communication protocol supported by the new device. Further, if the new device supports more than one communication protocol, multiple test commands, one for each type of protocol, may be issued.

The state manager monitors the state of each of the devices connected to the computing device, and determines if a state change of any of the devices occurs. Upon communication of the test command to the new device, the state manager determines if the new device changes state. For example, if the test command includes a command for the new device to power on, the state manager may determine if the new device powers on responsive to communication of the test command. If the state manager determines that the test command was successful, it informs the OOBE module of the successful test command, and the OOBE module instructs the state manager to notify all listeners (e.g., other devices, the command and control engine) that a new device is present.

If the test command is not successful, the command and control engine may resend the test command using a different communication protocol. When a successful communication protocol is identified, that communication protocol information may be stored in the settings module so that future device commands may be communicated via the successful communication protocol.

Figure 4:
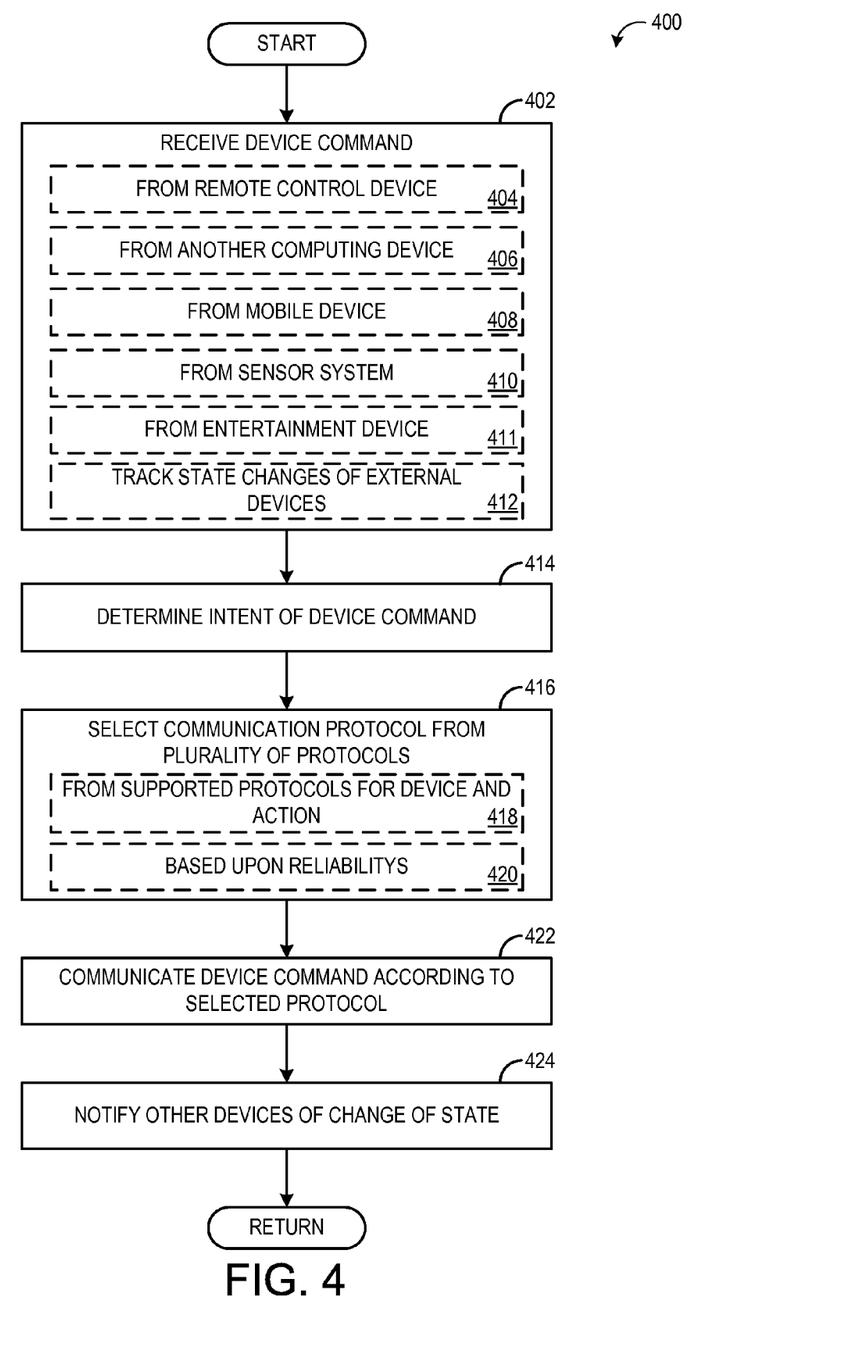
FIG. 4 is a flow chart illustrating a method for communicating a device command to an external device according to an embodiment of the present disclosure.

FIG. 4 is flow chart illustrating an embodiment of a method 400 for communicating a device command to an external device. Method 400 may be performed by any suitable computing device in a home entertainment system (e.g. computing device 102) to communicate a device command any suitable external device or devices, such as display device 104, set-top box 108, or receiver 110.

Method 400 includes, at 402, receiving a device command. The device command may comprise a command received from a user input device, such as a remote control device 404, another computing device 406 (e.g. laptop, notepad, desktop, etc.), a mobile device 408, a sensor system 410 (e.g. a sensor system that captures audio information, depth image information, and/or two-dimensional image information, and translates the audio and/or image information into user voice input and/or gesture input), and/or CEC-enabled entertainment device 411 (such as from set-top box 108), or another device, such as a game controller. Further, the computing system may also track state changes of one or more external devices, as indicated at 412.

At 414, method 400 includes determining the intent of the device command. The intent of the device command may include an action to be performed, and may or may not specify a device with which to perform the command. Where a device is not specified, the state of each of the external devices may be used as contextual information to determine the intent of the device command. For example, the state manager may determine that the sole device in operation with an audio output is the display device, and thus that the external device intended by the device command is the display device.

At 416, a communication protocol is selected from a plurality of protocols for communicating the device command to the intended external device. The communication protocol may be selected, for example, via a command and control engine, as explained above with respect to FIG. 2, or in any other suitable manner. As indicated at 418, the selection may be selected based upon protocols supported by the intended device, as well as protocols useable by the intended device to perform the intended action. Further, where more than one communication protocol may be used for the specified device and command, the device may select a protocol likely to be more reliable (e.g. a protocol that supports confirmation messages, that does not have line-of-sight limitations, that has a historically low rate of failures, etc.), as indicated at 420.

At 422, the device command is communicated to the external device according to the selected protocol. In order to communicate the device command to the external device, a module corresponding to the selected communication protocol may be called to transfer the device command to a corresponding driver or socket. For example, if an HDMI CEC protocol is chosen, an HDMI CEC module may pass the device command to an HDMI CEC driver, which may then send a signal over the HDMI connection between the computing device and the external device.

Further, at 424, the state manager may notify other external devices of changes of state that occur among the external devices, and the command and control engine may receive confirmation that the command was successfully communicated. Additionally, in some embodiments, if a change of state is not detected within a threshold amount of time, such as within five seconds, the state manager may notify the command and control engine that the device command was not successfully communicated. The command and control engine may then choose a second, different protocol to communicate the device command to the external device.

Thus, the disclosed embodiments may allow commands for home entertainment devices received from a variety of input devices (including user input devices as well as device-to-device control via HDMI CEC) to be efficiently coordinated and communicated to intended devices. While described herein in the context of home entertainment devices, other suitable devices may receive commands according to the embodiments described herein, such as lighting systems, fireplaces, air heating and cooling systems, etc.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
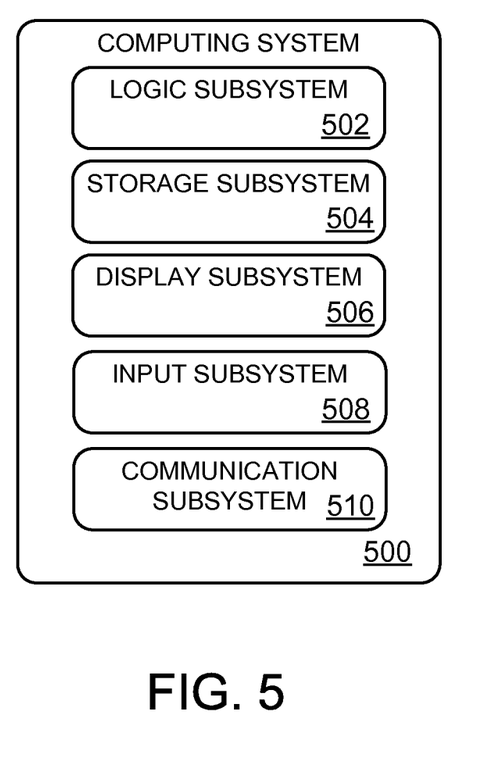
FIG. 5 schematically shows an example embodiment of a computing device.

FIG. 5 schematically shows a non-limiting embodiment of a computing system 500 that can enact one or more of the methods and processes described above. Computing device 102 is one non-limiting example of computing system 500. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic subsystem 502 and a storage subsystem 504. Computing system 500 may optionally include a display subsystem 506, input subsystem 508, communication subsystem 510, and/or other components not shown in FIG. 5.

Logic subsystem 502 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 504 includes computer readable storage media, such as one or more physical devices configured to hold instructions executable by the logic subsystem to implement the methods and processes described herein. When such methods and processes are implemented, the state of storage subsystem 504 may be transformed—e.g., to hold different data.

Storage subsystem 504 may include removable and/or built-in devices. Storage subsystem 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 504 may include volatile, nonvolatile, dynamic, static, read/write, read-only, random-access, sequential-access, location-addressable, file-addressable, and/or content-addressable devices.

It will be appreciated that storage subsystem 504 includes one or more physical devices and excludes propagating signals per se. However, aspects of the instructions described herein alternatively may be propagated by a communication medium (e.g., an electromagnetic signal, an optical signal, etc.), as opposed to being stored on a storage medium.

Aspects of logic subsystem 502 and storage subsystem 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 implemented to perform a particular function. In some cases, a module, program, or engine may be instantiated via logic subsystem 502 executing instructions held by storage subsystem 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 506 may be used to present a visual representation of data held by storage subsystem 504. This visual representation may take the form of a graphical user interface (GUI). As the herein described methods and processes change the data held by the storage subsystem, and thus transform the state of the storage subsystem, the state of display subsystem 506 may likewise be transformed to visually represent changes in the underlying data. Display subsystem 506 may include one or more display devices utilizing virtually any type of technology. Such display devices may be combined with logic subsystem 502 and/or storage subsystem 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On a computing device, a method for controlling one or more external audio-visual devices, the method comprising:
   receiving a device command;
   determining an intent of the device command, the intent including an action and an external device to perform the action;
   selecting a first selected protocol for communicating the device command to the external device, the selected protocol selected from a plurality of supported protocols;
   communicating the device command to the external device according to the selected protocol;
   detecting a state of the external device;
   determining that the device command was received by the external device when a change of state of the external device is detected;
   determining that the device command was not received by the external device when a change of state of the external device is not detected; and
   when it is determined that the device command was not received by the external device, then select a second selected protocol, different from the first, to communicate the device command to the external device, the selected protocol selected from the plurality of supported protocols.

2. The method of claim 1, wherein determining if the device command was received by the external device further comprises receiving confirmation that the device command was received by the external device.

3. The method of claim 2, further comprising, if the confirmation is not received within a threshold time, then communicating the device command to the external device according to a second protocol selected from the plurality of supported protocols.

4. The method of claim 1, wherein receiving the device command further comprises receiving the device command from one or more of a remote control device, a mobile device, a computing device, and a sensor system.

5. The method of claim 1, wherein the plurality of protocols comprises one or more of an infrared signaling protocol, an HDMI CEC protocol, an Internet protocol, a Wi-Fi direct protocol, and a BLUETOOTH protocol.

6. The method of claim 1, wherein the external device is a first external device and further comprising:
   determining a state of the first external device;
   detecting a change of the state of the first external device; and
   notifying a second external device of the change of the state of the first external device.

7. The method of claim 1, further comprising:
   sending a request for device capabilities of the external device to a remote computing device;
   receiving the device capabilities from the remote computing device; and
   selecting the selected protocol from the plurality of supported protocols based on the device capabilities received.

8. The method of claim 1, wherein communicating the device command to the external device according to the selected protocol further comprises communicating the device command via a pluggable communication module corresponding to the selected protocol.

9. The method of claim 8, further comprising:
   detecting a connection of a new external device;
   obtaining a new pluggable communication module corresponding to a protocol supported by the new external device; and
   communicating with the new external device via the new communication module.

10. A computing device comprising instructions executable to:
    receive a device command;
    determine an intent of the device command, the intent including an action and an external device to perform the action;
    select a first selected protocol for communicating the device command to the external device, the selected protocol selected from a plurality of supported protocols;
    communicate the device command to the external device according to the selected protocol;
    detect a state of the external device;
    determine that the device command was received by the external device when a change of state of the external device is detected;
    determine that the device command was not received by the external device when a change of state of the external device is not detected; and
    when it is determined that the device command was not received by the external device, then select a second selected protocol, different from the first, to communicate the device command to the external device, the selected protocol selected from a plurality of supported protocols.

11. The computing device of claim 10, wherein the device command is a first device command and the action is a first action, and wherein the instructions are further executable to:
    receive a second device command;
    determine an intent of the second device command, the intent of the second device command including a second action performable by the external device;
    select a second, different protocol from the plurality of supported protocols for communicating the second device command to the external device; and
    communicate the second device command to the external device according to the second protocol, wherein the second protocol is selected based on the second action.

12. The computing device of claim 10, wherein the instructions are executable to receive the device command from one or more of a remote control device, a mobile device, a computing device, and a sensor system, and to communicate the device command via one or more an infrared signaling protocol, an HDMI CEC protocol, and a wireless networking protocol.

13. The computing device of claim 10, wherein the instructions are further executable to:
    send a request to a remote computing device for device capabilities information for the external device;
    receive the device capabilities for the external device from the remote computing device; and select the selected protocol from the plurality of supported protocols based on the device capabilities received.

14. The computing device of claim 10, wherein the instructions are further executable to:
   detect a change of the state of the external device; and
   notify one or more additional devices of the change of the state of the external device.

15. A computer readable memory comprising instructions executable by a computing device to operate a command and control engine configured to:
   communicate with a plurality of communication modules, each communication module configured to control one or more external devices of a plurality of external devices according to a particular protocol,
   receive a device command,
   select a first communication module from among the plurality of communication modules to communicate the device command to a first external device of the plurality of external devices, and
   communicate the device command to the first external device via the first communication module, wherein the first communication module is configured to communicate with the first external device according to a first protocol; and
   wherein the instructions are further executable by the computing device to operate a state detection module configured to
   detect a state of each of the plurality of external devices,
   responsive to the command and control engine communicating the device command to the first external device, determine if the device command is received by the first external device based on a detected change of state of the first external device, and
   if the device command is not received, then instruct the command and control engine to select a second communication module to communicate the device command to the first external device.

16. The computer readable memory of claim 15, wherein the command and control engine is further configured to:
   receive a second device command,
   select a third communication module from among the plurality of control modules to communicate the second device command to a second external device of the plurality of external devices, and
   communicate the second device command to the second external device via the third communication module, wherein the third communication module is configured to communicate with the second external device according to a second protocol that is different than the first protocol.

17. The computer readable memory of claim 15, wherein the command and control engine is further configured to:
   send a request for device capabilities of the first external device to a remote computing device;
   receive the device capabilities from the remote computing device; and
   select the first communication module based on the device capabilities received.

18. The computer readable memory of claim 15, wherein the command and control engine is configured to receive the device command from one or more of a remote control device, a mobile device, a computing device, and a sensor system.

19. The computer readable memory of claim 15, wherein the plurality of communication modules comprises one or more of an infrared signaling module, an HDMI CEC module, and a wireless networking protocol.

* * * * *